United States Patent [19]
Thomas

[11] Patent Number: 6,073,079
[45] Date of Patent: Jun. 6, 2000

[54] METHOD OF MAINTAINING A BOREHOLE WITHIN A MULTIDIMENSIONAL TARGET ZONE DURING DRILLING

[75] Inventor: Jimmy R. Thomas, Harwood, Tex.

[73] Assignee: Shield Petroleum Incorporated, College Station, Tex.

[21] Appl. No.: 09/024,165

[22] Filed: Feb. 17, 1998

Related U.S. Application Data

[60] Provisional application No. 60/038,864, Feb. 18, 1997.

[51] Int. Cl.$^7$ ..................................................... G06F 19/00
[52] U.S. Cl. ................................................................. 702/9
[58] Field of Search ................................... 702/9, 16, 11, 702/12, 13; 367/73; 175/45

[56] References Cited

U.S. PATENT DOCUMENTS

| | | | |
|---|---|---|---|
| 5,064,006 | 11/1991 | Waters et al. ............................... | 175/45 |
| 5,191,557 | 3/1993 | Rector et al. ............................... | 367/41 |
| 5,311,951 | 5/1994 | Kyte et al. .................................. | 175/40 |
| 5,419,405 | 5/1995 | Patton ......................................... | 175/27 |
| 5,678,643 | 10/1997 | Robbins et al. ............................ | 175/45 |
| 5,842,149 | 11/1998 | Harrell et al. .............................. | 702/9 |

*Primary Examiner*—Donald E. McElheny, Jr.
*Attorney, Agent, or Firm*—Sidley & Austin

[57] ABSTRACT

Directional drilling techniques allow for the drilling of boreholes within the earth along any three dimensional path. This invention provides a method for determining the path a wellbore needs to take in order to stay within a defined three dimensional target. This is done by using the petrophysical and spacial information received from the portion of the wellbore as drilled. First, a three dimensional model of the target is constructed using seismic data. Then, the seismic data is used to create a depth model which is continually refined during the drilling operation. This will provide the needed information to steer the wellbore to any point within a three dimensional representation of the real target.

2 Claims, 4 Drawing Sheets

METHOD OF MAINTAINING A BOREHOLE WITHIN A MULTIDIMENSIONAL TARGET ZONE DURING DRILLING

CROSS REFERENCE TO RELATED APPLICATIONS

This application claims the benefit to prior filed co-pending U.S. Provisional Application 60/038864 filed Feb. 18, 1997.

BACKGROUND OF THE INVENTION

In the past, wellbores were drilled more or less straight down into the earth in order to penetrate target zones selected by the geologist. If the target zone was to be drilled through at a different point, then the rig was moved to a different position on the surface above that point and the well redrilled into the target. As might be expected this was expensive, so drillers learned to cause a well to deviate from the vertical at a point far enough above the target to angle over to the new target point. This process was called sidetracking the well. With experience, and improvement in the tools needed to perform this task, new applications for directional drilling were considered. Horizontal drilling techniques are a result of the application of advanced directional drilling to solve geological and reservoir engineering problems associated with the production of oil and gas from certain reservoirs.

The first horizontal wellbores were drilled vertically down to a point above the target formation then the directional driller directed the wellbore sideways in a curve until the wellbore was being drilled nearly horizontal in the target formation. Since the target zone was not always a flat evenly dipping formation, there arose a need to provide the directional driller with information about the target orientation in order for him to maintain the drill path in the target. This caused the development of tools and techniques to provide this information.

The first method used to steer a horizontal well was for the geologist to give the directional driller an estimate of the dip rate of the target formation along the expected drill path and analyze the cuttings coming out of the borehole to see if the drill path was staying within the formation. This method of steering worked only for thick targets with little or no changes in dip rate. But as the need for better steering developed, new tools were developed that provided the geologists with petrophysical measurements of the formation while drilling the well called MWD (Measurements While Drilling). This information allowed the geologist to see on a log of formation petrophysical information, if the borehole had been drilled within or outside the target formation. This form of steering provided good information about the drilled wellbore with respect to the target, but changes in the dip of the target and/or faulting could only be known after the drill path had exited the target, requiring the directional driller to try to steer back into the target. This restriction made horizontal drilling ineffective in certain complex geological situations.

Past targeting techniques provided only information about where the path of the well had already gone using well log correlations. When the well path encountered a change in the dip rate of the target interval it required the operator to traverse through the stratigraphic section in order to provide the operator with a correlative log section to determine the new dip of the target section, then requiring a major course correction to get back into the target followed by another correction after reacquiring the target to establish the new dip rate. Depending on the frequency and severity of the dip changes in the path of the well this process can severely decrease the effectiveness of steering operations at extended reaches and reduce the amount of time that the hole is in the target zone, thus possibly affecting the performance of the well.

Thus, there has been a need in the art to provide a better method for adjusting the drill path prior to drilling and while drilling is progressing towards the target or along the target path. Thus, the art has needed a method of steering that allows the geologist the ability to provide the directional driller information about the direction to steer by anticipating where the target is in advance of the borehole in a three dimensional picture. The present invention provides such a map and for revised mapping as the drilling progresses. This three dimensional roadmap of the target zone is the tool needed to steer the wellbore to any point within the target even in very complex targets with many abrupt dip changes and/or faulting, that would be impossible to steer through with the prior art. The target may be a specific point or may be a number of specific points. Thus, the target may be a target point or a target line (path). The present invention has many advantages which include providing an initial map of the target path to allow planning of the drilling operations, providing a corrected target path based in part on actual data determined as the bore progresses, allowing for early correction of the drill bit direction saving time and expense.

The process of the present invention also has the following advantages:

A. Provides the ability to anticipate changes in the dip rate of the target zone.

B. Reduces the frequency and duration of targeting slides.

C. Eliminates the need to traverse section in order to establish a new correlation and dips after a dip change.

D. Provides a true three dimensional targeting technique that provides information about dip changes as a result of changes in drill azimuth.

E. Reduces the number and severity of doglegs allowing for better steering and reducing the torque in the hole.
 1. Extends the reach of the well.
 2. Makes course correction slides quicker and more effective even in extended reach wells and multidimensional wells.

F. Reduces the well cost as a result of reducing slide time in the well.

G. Improves the well performance.

Other advantages of the present invention will become apparent from the detailed description.

SUMMARY OF THE INVENTION

One object of the present invention is to provide a method of steering a wellbore relative to a target zone even in very complex three dimensional situations.

This invention is a method which allows the operator of a horizontal or highly deviated well to steer within a defined target interval by continually updating and refining a three dimensional model of the target zone built from dip and depth data derived from 3D (three-dimensional) seismic, 2D (two-dimensional) seismic, well log control or any combination of the three.

The method of the present invention first establishes a model for the drill path of the well with respect to the target zone built from geophysical and petrophysical data. This model is continually refined while the well is being drilled by adjusting the model with the acquired true vertical depth measurements along the drill path thus compensating the seismic built model for velocity gradient changes and anomalies. Therefore dip changes can be made to the drill path at the same time that they occur within the target zone allowing the operator to stay within the target zone and eliminating the need for section traverses for steering. Because this technique provides for a three dimensional model, changes in well azimuth both intentional and unintentional can be adjusted for in the same way.

Another advantage of the present invention is that it can be used to steer through very complex structural and stratigraphic target sections including but not limited to faulting, thinning, pinchouts, channel cut and fill, unconformities, etc. The process of the invention begins with the construction of a geologic model built from geophysical and petrophysical data. However, since this method is dynamic during the drilling of the well, the Geologic Model is continually refined throughout the process. Therefore, the model will continually provide better and better steering information as the well is drilled.

In a preferred embodiment as shown in FIG. 4, the method of the present invention includes the steps of (a) selecting a target well path from seismic data for the well area; (b) determining from the petrophysical information for surrounding offset wells the seismic reflector corresponding to the selected target path; (c) calculating the depth of the target path at predetermined points along the path; (d) determining the travel time to the depth from seismic data; (e) preparing a velocity gradient for time to various points along the target path; (f) preparing a grid of x, y, and z data for the target path; (g) as the bore is drilled measuring the actual depth of the bore; (h) recomputing the target path using the actual velocity data from the actual bore depth; and (i) readjusting the direction of drilling if needed to bring onto the new path, and repeating the method at predetermined intervals as the actual wellbore progresses. In one embodiment the target path map is prepared by selecting the desired target path on seismic data for the well. By consulting the petrophysical information from surrounding offset wells the seismic reflector corresponding to the depth for the various target points can be determined. Next, the signal travel time to the depths is determined from the seismic data and a velocity gradient listing is prepared. Thereafter, an x, y, z grid can be prepared giving the time to target data for various points along the target path. From the velocity gradient the depth of the target path can be computed for points along the target path. From this data a first map three dimensional map of the target path can be prepared. This map will be an estimate based on the correlation of the various data points. As the wellbore proceeds, the actual depth of the bore is determined at a desired reference point. From this information the target path is recomputed using the actual velocity from the reference point. This will produce a new target path which again is an estimate but which will be a more accurate estimate because it begins its calculations from an actual point on the path.

BRIEF DESCRIPTION OF THE DRAWINGS

Other objects, features, and advantages of the present invention will be apparent through a study of the written description and the drawings in which.

DESCRIPTION OF THE PREFERRED EMBODIMENT

The present invention is a method for determining the target path of a well and to prepare a three dimensional map of that path. While the term map is used it is not limited to a tangible item in the form of what is traditionally thought of as a map, but includes the collection of data generated to represent the target path. Thus, the map may be purely data or may be a visual representation. The map is a series of data points representative of various locations along the target path.

Figure 1:
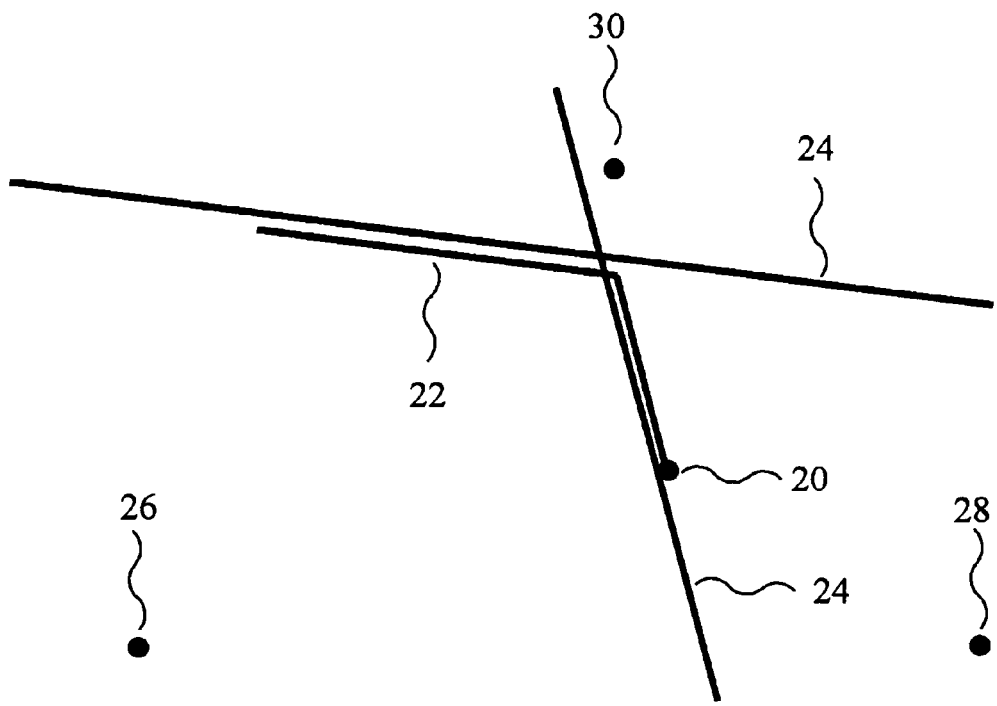
FIG. 1 is a map view of the well plan with the nearby well control and all seismic data.

The method of the present invention begins with the planning process. Starting with the plot of the expected path of the wellbore in a map view, existing petrophysical information is spotted onto the map. Existing geophysical shot points are spotted onto the map and an evaluation is done for the benefit of additional seismic data is performed. The process is best with either 3D seismic across the well path or 2D lines run in segments along each major segment of the well for Multi Dimensional wells. FIG. 1 is an example of a typical well plan map for the process. In FIG. 1, "surface location" 20 is the vertical wellbore from which the directional drilling will be performed. Well path 22 is the proposed path for the wellbore, and seismic lines 24 indicate seismic lines acquired for the purpose of steering the wellbores. Wells 26, 28, and 30 represent offset wells, data from which will be used in mapping the target path. There can be more or fewer offset wells.

Figure 2:
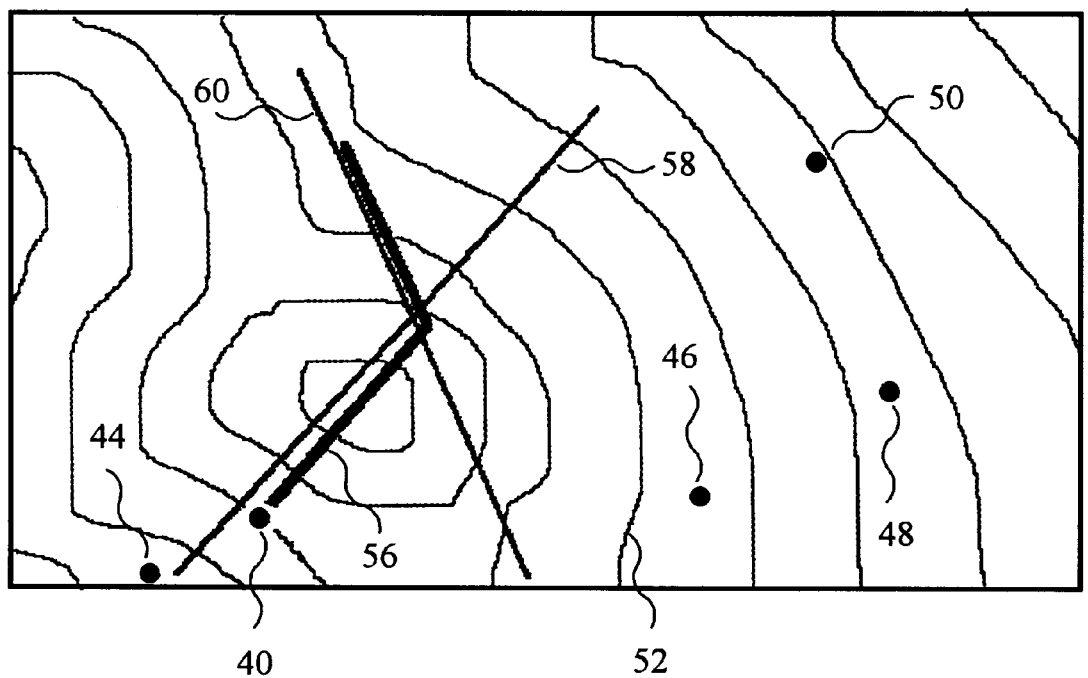
FIG. 2 is an example of a time contour map generated for the process.

After the data in the planning process is acquired then the construction of the Geologic model can begin. The 2D data is correlated at the tie points and any bulk shifts are done to tie the lines, the offset logs are then digitized as well as the pilot hole on the well to be drilled. Synthetic seismograms are then created from the digitized logs and adjusted with any direct velocity information from the wells in the area. Major geologic markers near the target zone as well as the target zone are marked on the synthetic seismograms. After any well synthetic seismograms are tied directly to the seismic data in the area of the well then a seismic velocity gradient map is constructed by contouring the velocities needed to tie the actual TVD (true vertical depth) data points to the seismic data. This map is then gridded in a process identical to the one described below. These geologic markers (tops) and the target are correlated into the seismic lines. These data points are then contoured onto the map showing points of equal time. In areas of many dip changes it is better to make the contour interval as small as possible. The map is then overlain with an X, Y grid oriented NS (North-South) and EW (East-West) placing the surface location of the well to be drilled at the origin (where X=0 and Y=0) as shown in FIG. 2. In FIG. 2, the surface location of the well to be drilled is 40, the offset wells are shown as 44, 46, 48 and 50. Contour lines, such as contour lines 52 and 54 represent various levels of depth in the well known manner of structure contour maps. The well path is shown as 56 and seismic lines 58 and 60 can be included.

Finally, a depth map can be generated from the two gridded maps by computing a depth for each X, Y data point by computing the depth using the time and velocities from that same X, Y point off of the other two gridded maps. This process allows for the construction of a depth to surface contour map using unique velocities at each data point.

Figure 3:
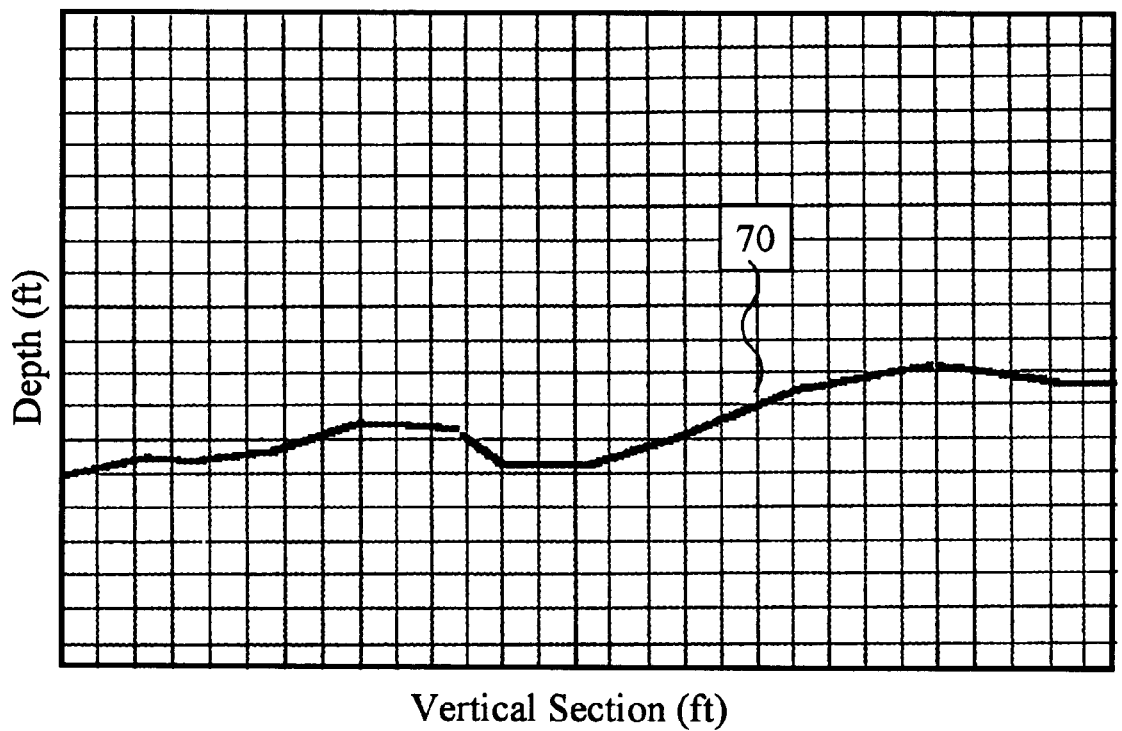
FIG. 3 is a cross section along the drill path showing the anticipated target information.
Figure 4:
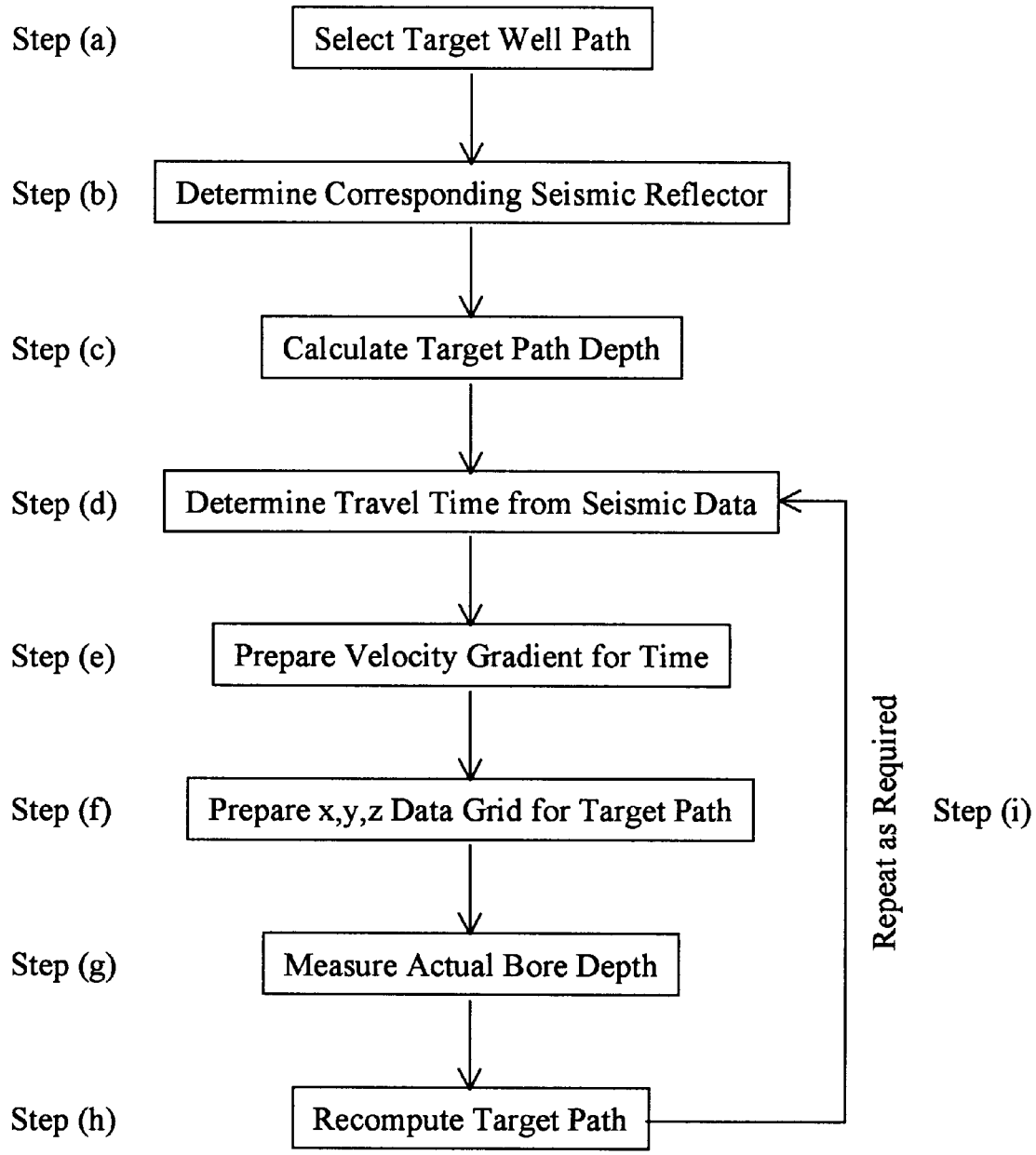
FIG. 4 is a flow chart for the process.

A vertical cross-section can now be constructed along the path of the well by scaling off from the origin to each vertical section point along the well path. Then reading the depth to target or true vertical depth off the contour, lines can then be plotted onto the section. The resultant vertical section plot of the TVD and dips along the intended path of the wellbore are independent of any changes in the azimuth of the well path as it is a plot of vertical section in the X axis and TVD in the Y axis as shown in FIG. 3. In FIG. 3 the depth is shown on the vertical axis and the vertical section to be drilled is shown on the horizontal axis. It should be noted that the depth of the target path 70 can vary as the path extends away from the surface location of the wellbore, but the depth may be constant in some cases.

This process is most accurate when the seismic data lies along the well path or very near to it. The gridding of the contour lines in this process involves an interpolation of data points between the actual seismic and well data points. This process creates a gridded three dimensional depth map of the target. If 3D seismic data is used instead of 2D seismic data, there is real seismic data at each X, Y point on the map; therefore, no interpolation of data points and overall much better accuracy is achieved.

The final steps involved are the adjustments to the gridded maps made during the actual drilling of the well. This part of the process involves refining the gridded target surface as the well is drilled with the actual TVD to target and azimuth data received from MWD and survey instruments in the drill string. Then using the time for that X Y data point a corrected velocity is then recomputed for the velocity grid. The interpolation or contouring of the velocity map is then redone and the values to each data point are then updated. After this step the depth values for the depth grid are then recomputed for each X Y point, followed by an update to the Targeting Section. The process is then repeated with each new well survey data point providing the operator of the well with a very accurate picture of the projected depth TVD of the target before the point of penetration even with changes in the dip rate due to structural or stratigraphic changes or during changes in the azimuth of the well. The further that the well is drilled away from the surface location the more data points are updated in the grid causing greater influence to the velocity gradient map also improving the correctness of each new data point as it is drilled.

Steering across complex geologic features such as faulting with this process is done by plotting the faulting into the geologic model. Any faulting within the area is identified on the seismic data and the trace of the faulting is added to the time and depth contour maps during the planning stages for the well. Since the velocity measurements used in the time to depth conversions are continually updated and the velocity gradient map is continually being refined during the drilling of the well, the anticipated throw (offset) across any faulting is very accurate and the operator can determine the penetration point of the well path across the faulting. The decision can then be made to acquire a new target zone or reacquire the original target by traversing a known amount of section. The drilling direction is adjusted, if necessary, each time the path is recomputed.

EXAMPLE OF THE PRESENT INVENTION

An example of the method of the present invention will be described. In FIG. 1 there is shown a map view of the wellbore surface location as well as the planned path of the wellbore. The seismic data points are also placed onto the map FIG. 1 as well as the offset well locations from which petrophysical information has been obtained. The well logs of petrophysical information obtained from the offset well locations are correlated and target reference points are identified on each of the logs. Target reference points from the offset well logs are then identified on the seismic lines near the offset well locations to determine which reflector on the seismic corresponds to each target reference point. The method for best making this determination is to make a synthetic seismogram from the petrophysical information log and compare this to the seismic data point nearest the offset well location. The method of creating a synthetic seismogram is common to the industry and is not made a part of the description of this process. At this point a target or target center line is selected and identified on each of the offset well logs. If there is no identifiable continuous reflecting event on the seismic data corresponding to the target or target center line then the nearby target reference points which do correspond to continuous reflective events on the seismic data are adjusted to phantom to the target.

The target line or target center line along with the target reference points are drawn along the seismic lines at their proper places. The seismic data is a measure of the two way travel time down to formation points where there was enough of a density contrast to cause a reflection of energy back to the recording instruments at the surface. Therefore, if the geologist knows the average velocity of energy waves through all the earth between the reflector and the surface, then the depth to that point in the earth is computed as the travel time multiplied times the average velocity divided by two (depth=(travel time)×(average velocity)/2). All times and depths are adjusted to sea level as a common surface reference point in order to correct for differences in surface and rig elevation. One way to determine the average velocity at a given point is to read the depth from the offset well logs, then correct that depth to mean sea level. After the depth to a target or target reference point is determined then the two way travel time to said point can be determined by reading it directly off of the seismic data at that point. With depth and travel time known using the formula stated hereinabove one can solve for the average velocity. Using this technique the geologist can then build a velocity gradient map.

At this point in the process it is important to point out that if the average velocity was known at every seismic data point then the seismic data could be scaled very accurately as a depth section. This is the central point to the success of this steering process. The problem is that the depth is not known at every point and the average velocity must be estimated at most data points by interpolating the data between known data points. The accuracy of this interpolation process is directly affected by the number and proximity of known data points. The success of this method results from the fact that while drilling the wellbore at or near the target zone there are generated a large number of close proximity depth data points, just the very thing needed to insure the accuracy of the model very near the bit.

The next step in the example is to generate an X, Y, Z grid of data from the seismic time to target data. The X and Y measurements are scaled two dimensional reference points defining each data point relative to the surface location of the well to be drilled with the $Z_t$ value being the actual or interpolated time data from the actual seismic line or 3D seismic grid. This operation can be done by hand or with the aid of a computer. If done by hand the actual time points are used by the geologist to interpret the data by hand, contouring the map drawing lines of equal data points incrementally spaced across the map. Using this method the time or $Z_t$ value for any XY point can be determined by finding that point on the map and interpolating between the nearby time contour lines. However, if a computer is used for the process, there are many excellent gridding functions available that achieve excellent results. The advantages of using a computer to perform the process are mainly accuracy, repeatability and time.

As mentioned earlier in the Summary it is very important in the well planning process to gather as much real seismic data along the expected well path as possible. For this reason 3D seismic works best but if a number of 2D lines are acquired in a pattern then good results can also be expected. It is known that the accuracy of any interpolated time data point is directly affected by the proximity and number of real seismic data points.

The next step in the example is to compute a true vertical depth to the target or $Z_{dt}$ (depth computed on time) for each XY location reference point using the following relationship defined earlier in the description ($Z_{dt}=Z_t \times Z_v/2$). This operation will generate a three dimensional grid of data defining the position of the target at any location. This data can be displayed as a three dimensional surface or contour map. The position of the wellbore can now be displayed as either a line or series of points along the three dimensional surface or in a two dimensional cross section of points along the well path as shown in FIG. 3.

Finally, during the drilling operation while the wellbore is in the process of being steered, actual depth or TVD (True Vertical Depth) measurements from the wellbore as each XY reference is reached, Zd (measured depth to target) is replaced into that point as an actual data point replacing the computed depth. Since the point being replaced was computed from an actual Zt and an interpolated Zv the new Zd is an actual data point; therefore, an actual Zv, the average velocity at the actual point, can be computed using Zv=(Zt/2)/Zd. The velocity data points are reinterpolated using each new Zv data point improving the quality of the interpolated points near the wellbore. With a whole new set of interpolated Zv data the Zd data points are then recomputed, further improving the overall accuracy of the model. This new data can then be used to provide the directional driller with the needed data to continue to drill along the targeted path.

Various modifications to the present invention will be apparent to those skilled in the art without departing from the invention as described above in relation to the preferred embodiments.

What is claimed is:

1. A method of mapping for directional drilling comprising:
    (a) selecting a target well path from seismic data for the well area;
    (b) determining from the petrophysical information for surrounding offset wells the seismic reflector corresponding to the selected target path;
    (c) calculating the depth of the target path at predetermined points along the path;
    (d) determining the travel time to the depth from seismic data;
    (e) preparing a velocity gradient for time to various points along the target path;
    (f) preparing a grid of x, y, and z data for the target path;
    (g) as the bore is drilled measuring the actual depth of the bore; and
    (h) recomputing the target path using the actual velocity data from the actual bore depth.

2. The process of claim 1 comprising the additional steps of repeating the steps at predetermined intervals as the actual wellbore progresses.

* * * * *